US010812286B2

(12) United States Patent
Panchapakesan et al.

(10) Patent No.: US 10,812,286 B2
(45) Date of Patent: Oct. 20, 2020

(54) DEVICE SCENARIO MANAGEMENT

(71) Applicant: VMware, Inc., Palo Alto, CA (US)

(72) Inventors: Ramani Panchapakesan, Bangalore (IN); Suman Aluvala, Bangalore (IN)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 16/247,674

(22) Filed: Jan. 15, 2019

(65) Prior Publication Data
US 2020/0228365 A1 Jul. 16, 2020

(51) Int. Cl.
*H04L 12/28* (2006.01)
(52) U.S. Cl.
CPC ........ *H04L 12/2814* (2013.01); *H04L 12/281* (2013.01); *H04L 12/2809* (2013.01); *H04L 12/2812* (2013.01); *H04L 12/2818* (2013.01)
(58) Field of Classification Search
None
See application file for complete search history.

(56) References Cited

U.S. PATENT DOCUMENTS

| | | | | |
|---|---|---|---|---|
| 9,485,657 | B2 * | 11/2016 | Bae | H04L 12/2816 |
| 9,584,482 | B2 * | 2/2017 | Burns | H04L 12/66 |
| 9,712,491 | B2 * | 7/2017 | Burns | H04L 12/66 |
| 9,721,441 | B2 * | 8/2017 | Lee | H04L 67/125 |
| 9,876,651 | B2 * | 1/2018 | Cho | H04L 12/2816 |
| 10,506,642 | B2 * | 12/2019 | Henrique Minatel | H04B 5/0056 |
| 2004/0205766 | A1 * | 10/2004 | Lee | H04L 67/20 |
| | | | | 719/311 |
| 2011/0106279 | A1 * | 5/2011 | Cho | G08C 17/02 |
| | | | | 700/90 |

* cited by examiner

*Primary Examiner* — K. Wong
(74) *Attorney, Agent, or Firm* — Thomas | Horstemeyer, LLP (57) ABSTRACT

Disclosed are various examples for dynamically generating and implementing scenario profiles for a network of devices, including IoT devices. A managed device can receive a dynamically generated scenario profile that defines tasks to be performed by the device for a given scenario. The device can also receive a scenario message that is broadcasted to all managed devices in a network and identifies an occurrence of a given scenario. If the device determines that the device is an intended recipient of the scenario message, the device can identify the scenario profile associated with the given scenario and perform the tasks defined by the scenario profile. The scenario profile can be modified and/or updated based on event data associated with the device.

20 Claims, 4 Drawing Sheets

DEVICE SCENARIO MANAGEMENT

BACKGROUND

With the emergence of Internet of things (IoT) devices, physical objects can gather data and interact with the physical world. A network of IoT devices can be utilized to improve operations and provide new services. Different types of IoT devices have different capabilities that can be useful in interacting with the physical world. For example, IP-enabled thermostats can be remotely controlled to adjust to a specific setting and can further provide real-time sensor data (e.g., sensor data). Further, IP-enabled lighting systems can be controlled to adjust to particular settings.

Typically, IoT devices can be controlled by a centralized control device (e.g., smartphone, smart speaker, etc.). The control device can pair with each of the different devices on a network to establish a communication line. Using a control and command configuration, the control device can instruct the different devices to behave in a defined manner. Further, the control device can receive sensor data and/or other information from the devices that can be useful in understanding a given environment.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to generating and implementing scenario profiles for a network of devices. In particular, IoT devices, for example, each have different capabilities and can interact with a physical world. The scenario profiles can define tasks to be performed by the different devices in a network for a given scenario. Each device can implement the tasks defined by the scenario profile allowing each device to work collaboratively in a network while eliminating a need for point-to-point communications, device awareness, and centralized control.

A scenario can include any type of event defined by an administrator that utilizes the different tasks and/or capabilities of the devices within the network. A scenario can include a meeting, a cooking of a meal, an individual coming home from work, an individual waking up, a party, and/or other type of scenario where IoT devices having specific capabilities can be used to create an environment related to the scenario. For example, in a meeting scenario, a meeting room can contain a television, a lighting system, speakers, blinds, and a projector. Each of these devices have a set of tasks that they each can perform. For example, for a meeting scenario, a television can be powered on and the volume set to a particular setting. Further, the lights can be dimmed and the blinds can be closed. In a scenario corresponding to a person waking up in the morning, the different tasks can include setting a temperature of a room, brewing coffee, turning on lights, turning the television on and setting the television on a news channel, etc.

Typically, networks including IoT devices implement a command and control configuration in order to interact with the different IoT devices in the network. Specifically, different types of IoT devices having different functionalities can be paired to a control device (e.g., smartphone, smart speaker, etc.) that includes an application capable of controlling the various IoT devices. In order to be controlled and/or receive commands from the control application of the control device, an IoT device must first pair with the control device to establish a communication line. In this situation, the control device is aware of and directly paired to each of the different IoT devices in the network.

However, the traditional command/control configurations are not easily scalable, making it difficult to add new devices to the network. When a new IoT device joins the network, custom software is required for the control device to understand and control the different capabilities of the new IoT device. Further, when a given scenario occurs that requires the use of multiple devices, the control device is required to follow a series of if/then steps for each of the devices to set up the devices for a particular scenario. For example, if the scenario relates to a meeting, the control device runs through a list of programmed steps with respect to each of the IoT devices (e.g., "if television, then instruct television", "if lights, dim lights to setting A," etc.). Accordingly, it can be beneficial to create an environment where the devices can be preconfigured to perform one or more tasks and work collaboratively together without being under control of a centralized control device.

The present disclosure relates to a network configuration that generates and implements profiles that define tasks to be performed by different IoT devices in a network for a given scenario. According to various implementations, the traditional command/control configuration is replaced by a configuration that allows each device to work collaboratively in a network while eliminating a need for point-to-point communications, device awareness, and centralized control.

According to various implementations of the present disclosure, scenario profiles are generated for IoT devices in a network. A scenario profile identifies different tasks that are to be performed by a given device during a particular scenario. As different devices can perform different tasks, the scenario profiles can differ among devices for a given scenario. According to some implementations, a management service generates the scenario profiles according to administrator input. In other implementations, the management service dynamically generates the scenario profiles according to device data indicating a history of configuration settings. The management service can update and/or modify the scenario profiles. The management service can distribute the scenario profiles to the devices in the network.

When a particular scenario occurs, a scenario message can be broadcasted to each device in a network. The scenario message identifies a scenario as well as other parameters such as, for example, device group, a time of scenario occurrence, content associated with the scenario, and/or other information. For example, if a meeting is about to start in Meeting Room A, a user can provide an input in a device application of a user device indicating the start of the meeting. The user device can generate a scenario message identifying the scenario and request the management service to broadcast the message to all devices on the network.

An agent application executed on each of the devices in the network can listen for scenario messages. When an agent application receives a scenario message, the agent application can determine if the device is an intended recipient of the message based on information included in the message (e.g., device group). If the device is not an intended recipient of the message, the device can ignore the message. However, if the device is an intended recipient, the device can access the scenario profile associated with the scenario identified in the message and implement the tasks defined by the scenario profile. Accordingly, devices can implement tasks for a given scenario without being paired to or instructed by a control device.

Figure 1:
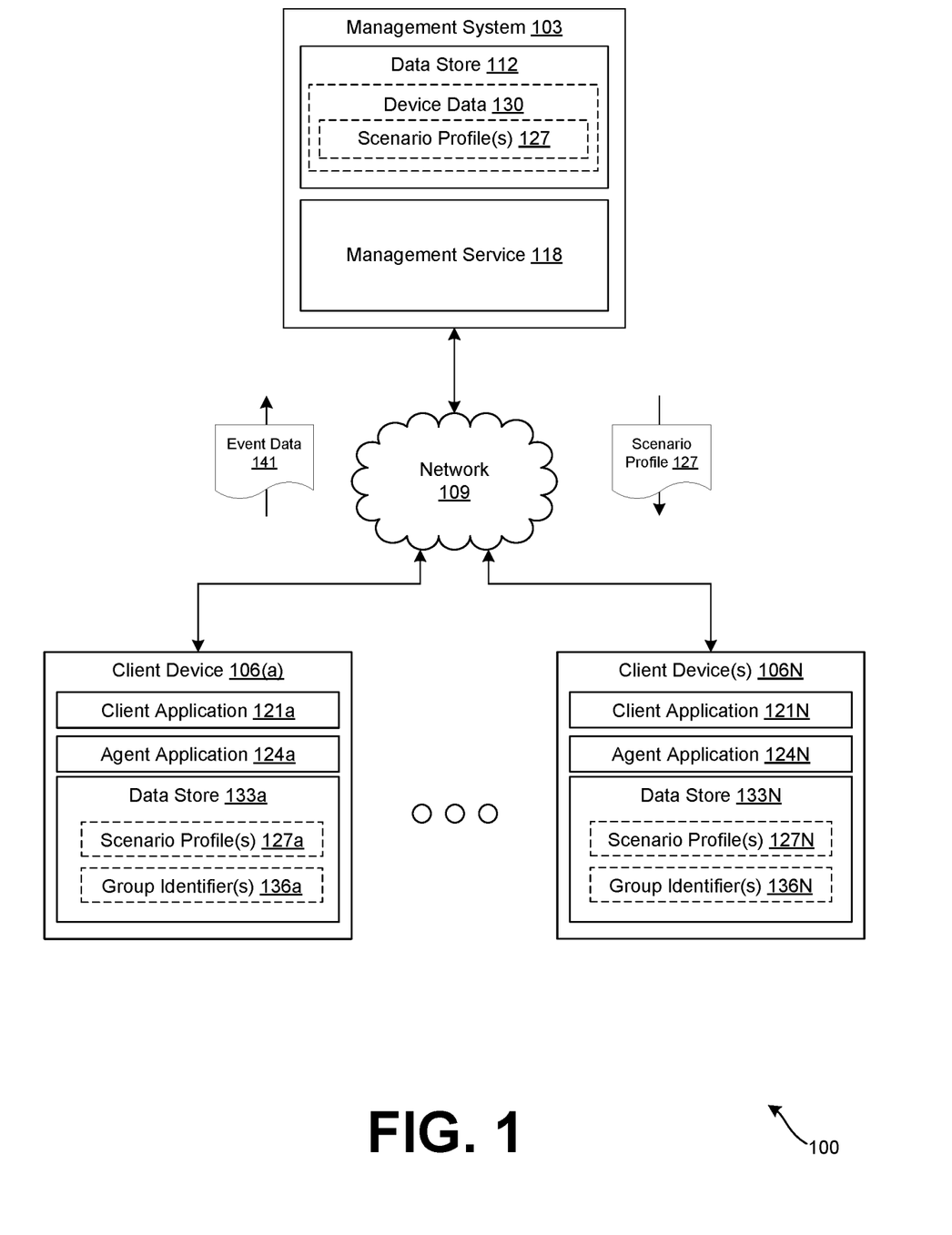
FIG. 1 is a drawing of an example of a networked environment, including a management system and a client device.

With reference to FIG. 1, shown is an example of a networked environment 100. The networked environment 100 can include a management system 103 and client devices 106a . . . 106N (collectively "client devices 106") in communication with one another over a network 109. The network 109 can include, for example, the Internet, intranets, extranets, wide area networks (WANs), local area networks (LANs), wired networks, wireless networks, other suitable networks, or any combination of two or more such networks. For example, the networks can include satellite networks, cable networks, Ethernet networks, telephony networks, and other types of networks.

The management system 103 can include, for example, a server computer or any other system providing computing capability. Alternatively, the management system 103 can include a plurality of computing devices that are arranged, for example, in one or more server banks, computer banks, or other arrangements. The management system 103 can include a grid computing resource or any other distributed computing arrangement. The computing devices can be located in a single installation or can be distributed among many different geographical locations. The management system 103 can also include or be operated as one or more virtualized computer instances. For purposes of convenience, the management system 103 is referred to herein in the singular. Even though the management system 103 is referred to in the singular, it is understood that a plurality of management system 103 can be employed. As the management system 103 communicates with the client devices 106 remotely over the network 109, the management system 103 can be described as a "remote" or "cloud" management system 103.

The management system 103 can include a data store 112. The data store 112 can include memory of the management system 103, mass storage resources of the management system 103, or any other storage resources on which data can be stored by the management system 103. The data stored in the data store 112, for example, can be associated with the operation of the various applications or functional entities described below.

The components executed on the management system 103 can include, for example, a management service 118, as well as other applications, services, processes, systems, engines, or functionality not discussed in detail herein. The management service 118 can oversee the management and operation of the client devices 106. The management service 118 can cause various software components to be installed on a client device 106. Such software components can include, for example, client applications 121a . . . 121N (hereinafter "client applications 121"), resources, libraries, drivers, device configurations and profiles, or other similar components that require installation on the client device 106 as specified by an administrator of the management service 118. The management service 118 can further cause policies to be implemented on a client device 106. Policies can include, for example, restrictions or permissions pertaining to capabilities of a client device 106.

The management service 118 can interact with one or more client applications 121 executed on the client device 106 to perform management functions. In one example, the management service 118 interacts with an agent application 124a . . . 124N (hereinafter "agent application 124") on a client device 106 to enroll the client device 106 with the management service 118. When enrolled, the agent application 124 can be registered as a device administrator of the client device 106, which can provide the agent application 124 with sufficient privileges to control the operation of the client device 106. In one example, the agent application 124 can be registered as the device administrator through the installation of a management profile at the operating system of the client device 106 that causes the operating system to designate the agent application 124 as the device administrator.

The management service 118 can direct the agent application 124 to perform device management functions on the client device 106. For example, the management service 118 can direct the agent application 124 to control access to certain software or hardware functions available on the client device 106. In some implementations, the management service 118 can remotely configure the client device 106 by interacting with the agent application 124 executed on the client device 106. The management service 118 can dynamically generate scenario profiles 127 for the different types of client devices 106 and different capabilities of the client devices for a given scenario. The scenario profiles 127 define tasks and/or settings for a client device 106 with respect to a given scenario.

The management service 118 can further provision data (e.g. scenario profile 127) to the client device 106 through the agent application 124. In one example, the management service 118 can cause the agent application 124 to control the use of the client device 106 or provision data to the client device 106 through use of a command queue provided by the management service 118. In some examples, the management service 118 can store commands in a command queue associated with a particular client device 106 and accessible by the particular client device 106.

In some examples, the management service 118 can transmit an instruction to an original equipment manufacturer (OEM) messaging service specific to the client devices 106 (e.g., ANDROID CLOUD MESSAGING SERVICE™ for ANDROID client devices) to cause the OEM specific messaging service to send an instruction to the operating systems of the client devices 106, which causes the client devices 106 to retrieve data from the command queues provided by the management service 118. In other examples, the agent application 124 is executed by such client device 106 to retrieve the contents of the command queue. In one example, the agent application 124 can retrieve the contents of the command queue on a configured interval, such as every four hours, or upon detection of a certain event, such as detection of an unauthorized application being executed by the client device 106. The management service 118 can also push commands to the agent application 124.

In any case, the agent application 124 can receive the contents of the command queue from the management service 118. In one example, the contents of the command queue can include a scenario profile 127 generated by the management service 118. In another application, the command queue can include a command that the agent application 124 should cause to be executed on the client device 106. In another example, the contents of the command queue can include a resource or other client application 121 that the agent application 124 should cause to be installed on the client device 106, which the client device 106 can access through a specified uniform resource locator (URL).

The data stored in the data store 112 can include, for example, device data 130, as well as other data. The device data 130 can include information about the client device 106. The device data 130 can include, for example, information specifying applications that are installed on the client device 106, configurations or settings that are applied to the client device 106, user accounts associated with the client device 106, the physical location of the client device 106, an enterprise associated with the client device 106, the network to which the client device 106 is connected, a device group, capabilities of the client device 106, a client device type (e.g., smartphone, smart television, IoT lighting system, IoT cabinet, etc.), historical configuration data, and/or other information associated with the client device 106. The device data 130 further includes the scenario profiles 127 generated for the client device 106 for a given scenario. The scenario profiles 127 define one or more tasks and/or settings to be executed by the client device 106 in response to a given scenario. The scenario profiles 127 can be in Extensible Markup Language (XML) format, JavaScript Object Notation (JSON) format, and/or any other type of format as can be appreciated.

The client device 106 can be representative of one or more client devices 106. The client device 106 can include a processor-based system, such as a computer system, that can include a desktop computer, a laptop computer, a personal digital assistant, a cellular telephone, a smartphone, a set-top box, a music player, a tablet computer system, a game console, an electronic book reader, Internet-of-Things (IoT) devices (e.g., appliances, thermostats smart, lighting products, smart cabinets, smart blinds/shades, projectors, speakers, printers, locks, vehicles, controllers, actuators, monitors, tablets, etc.) or any other device with like capability. The client device 106 can also be equipped with networking capability or networking interfaces, including a localized networking or communication capability, such as a near-field communication (NFC) capability, radio-frequency identification (RFID) read or write capability, or other localized communication capability.

The client device 106 can include an operating system configured to execute various applications, such as client applications 121, an agent application 124, and/or other applications. Some client applications 121 can access network content served up by the management system 103 or other servers, thereby rendering a user interface on a display, such as a liquid crystal display (LCD), touch-screen display, or other type of display device. To this end, some client applications 121 can include a web browser or a dedicated application, and a user interface can include a network page, an application screen, or other interface. Further, other client applications 121 can include device management applications, enterprise applications, social networking applications, word processors, spreadsheet applications, media viewing applications, or other applications.

The agent application 124 can perform device management functions of on the client device 106. The agent application 124 can further interact with the management service 118 to receive scenario profiles 127 defining tasks to perform during a given scenario. The agent application can further listen to the network for scenario messages 139 (FIG. 2) that are broadcasted over the network work. In response to receiving a scenario message 139, the agent application 124 can determine if the client device 106 is an intended recipient of the scenario message 139. If the client device 106 is an intended recipient, the agent application 124 can implement the tasks defined by a corresponding scenario profile 127.

In some implementations, the agent application 124 can listen for events that occur with respect to the device 106. For example, a user can manually adjust a setting and/or a feature associated with the client device 106. When a setting and/or a feature is adjusted, the agent application 124 can record the event along with a timestamp of the event occurrence. The agent application 124 transmit the event data 141 including the event notification and timestamp to the management service 118. The management service 118 can use the event data 141 to determine whether adjust and/or modify a given scenario profile 127.

The client device 106 can also include a data store 133a ... 133N (hereinafter "data store 133"). The data store 133 can include memory of the client devices 106 or any other storage resources on which data can be stored by the client device 106. The data store 133 can include scenario profiles 127, one or more group identifiers 136a ... 136N (hereinafter "group identifier 136"), and/or other data. The data store 133 can include other data associated with the client application 121, the operating system, and the agent application 124.

The scenario profiles 127 correspond to specific scenario profiles generated for the particular type of client device 106 for a given scenario. For example, one stored scenario profile 127 can be for a scenario for "Begin Meeting—User A," and another stored scenario profile 127 can be for a scenario of "Begin Meeting—User B." Where both scenarios are related to meetings, but for different users. In addition, assume that client device 106a includes a first type of IoT device (e.g., television), and client device 106N includes a second type of IoT device (e.g., thermostat). The scenario profiles 127 for the same scenario will be different for the different client devices 106 since the different client devices 106 have different capabilities.

The group identifier(s) 136 included identifiers that indicate groups of devices 106 in which a particular client device 106 can be assigned. For example, in a network of devices 106, the devices 106 can be located in different areas. In some implementations, a device group can be formed with respect to the different locations of the devices (e.g., devices in Meeting Room A, devices in the kitchen, etc.). In other implementations, a device group can be formed according to the type of scenario. For example, if the scenario relates to a person waking up, the different devices 106 that can perform tasks related to the person waking up may not be in the same location (e.g., floor warmer in bathroom, start coffee pot in kitchen, turn on television in living room, etc.). However, each of the devices 106 can be assigned to a closed group specific to the scenario. In some implementations, a device 106 can be assigned to multiple groups. For example, a television can belong to a group for Meeting Room A and a group associated with Building A.

Figure 2:
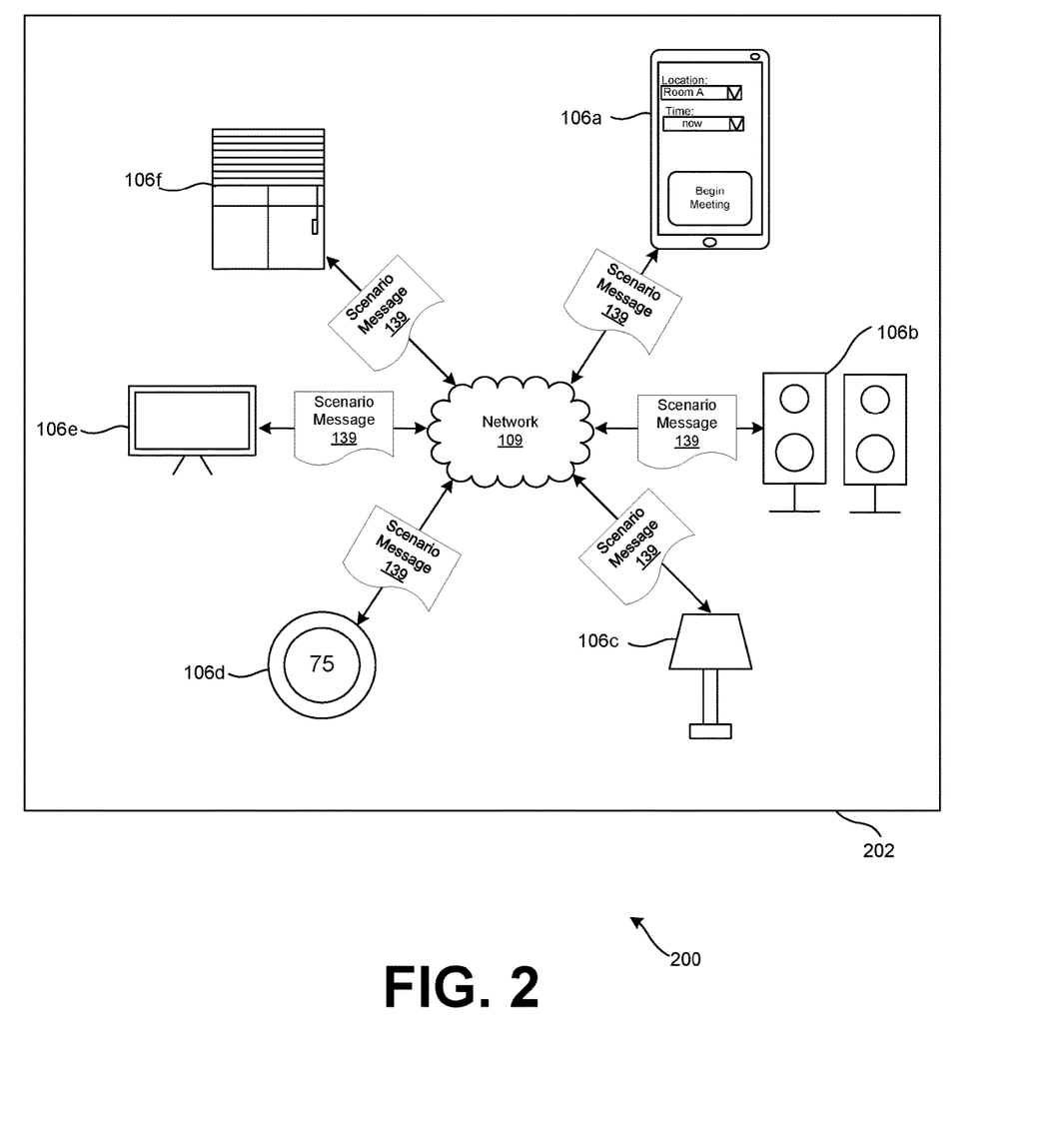
FIG. 2 is a drawing of another example of a network environment including multiple client devices, including IoT devices, receiving a broadcasted scenario message indicating a scenario.

The group identifier 136 can include a numeric number, a name, and/or any other type of identifier that can be used by the agent application 124 to determine whether a particular device 106 belongs in a group indicated in a scenario message 139 (FIG. 2). The data store 133 can include other data associated with the client application 121, the operating system, and the agent application 124.

Next, a general description of the operation of the components of the networked environment 100 is provided. To begin, an administrator can define a particular scenario that involves one or more client devices 106, including IoT devices, in the network 109. The scenario can include any type of event defined by an administrator that utilizes the different tasks and/or capabilities of the devices 106 within the network 109. A scenario can include a meeting, a cooking of a meal, an individual coming home from work, an individual waking up, a party, and/or other type of scenario where IoT devices, having specific capabilities can be used to create an environment related to the scenario.

For example, in a meeting scenario, a meeting room can contain a television, a lighting system, speakers, blinds, and a projector. Each of these devices have a set of tasks that they each can perform. For example, for a meeting scenario, a television can be powered on and the volume set to a particular setting. Further, the lights can be dimmed and the blinds can be closed. In a scenario corresponding to a person waking up in the morning, the different tasks can include setting a temperature of a room, brewing coffee, turning on lights, turning the television on and setting the television on a news channel, etc.

In some implementations, an administrator can define an initial set of tasks to be performed by each different type of device 106 for a given scenario. According to the parameters defined by the administrator, a management service 118 can generate a scenario profile 127 for each of the different devices 106 in the network 109. The scenario profile 127 defines the tasks for a client device 106 to perform when a given scenario occurs. The scenario profiles 127 can be in Extensible Markup Language (XML) format, JavaScript Object Notation (JSON) format, and/or any other type of format as can be appreciated. For example, a scenario profile 127 in XML format for a meeting scenario can include:

<?xml version="1.0"?>
<devicescenarioprofile>
<devicetype>Television</devicetype>
<name>Start Meeting</name>
<actions>
<action name="TVOn" value="true"/>
<action name="SetVolume" value="25"/>
<action>name="PlayContent" value="parameter. Content"</action>
</actions>
</devicescenarioprofile>

In this example, the scenario profile 127 is generated for a television. The scenario profile 127 is defined such that when a television in the network 109 receives a scenario message 139 naming a scenario as "Start Meeting," the television powers on, sets the volume to 25, and if a "content" parameter is included in the scenario message 139, plays the content. Once the scenario profile 127 is created, the management service 118 can distribute the scenario profile 127 to all television devices 106 in the network 109.

In some implementations, the management service 118 can modify the scenario profiles 127 according to administrator input and/or identified patterns in configurations of client devices 106 using event data 141 received from the client devices 106. For example, assume a user adjusts a particular setting and/or feature of a particular device 106 during the time of a known scenario. The agent application 124 of the client device 106 can collect event data 141 associated with different events and transmit the event data 141 along with a timestamp of the occurrence of the event to the management service 118. The management service 118 can analyze the event data 141 to identify patterns associated with the device configurations and adjust the scenario profile 127 accordingly.

When a particular scenario occurs, a scenario message 139 can be generated and broadcasted out to all of the devices 106 in the network 109. The scenario message 139 can identify the type of scenario, a time of the scenario occurrence, a device group associated with the scenario, content associated with the scenario (e.g., presentation, video content, audio content, images, etc.), and/or other information as can be appreciated. In some implementations, the scenario message 139 can be generated by a client application 121 on a particular device 106 in response to receiving a user input identifying the scenario. For example, if the scenario corresponds to the start of a meeting, a user provide a user input via a user interface rendered on a client device 106 that indicates the start of a meeting. The client device 106 can then generate a scenario message 139 that can be broadcasted out to the devices 106 in the network 109 to notify the client devices 106 of the scenario.

In some implementations, the scenario message 139 can be generated by a trigger event associated with a particular device 106. For example, an opening of a smart garage door can cause a client application 121 of the smart garage door to generate a scenario message 139 indicating a scenario of a person coming home. In other implementations, the scenario message 139 can be automatically generated by the client application 121 of a client device at a predefined time for a particular scenario. For example, if the scenario relates to a person waking up, a client application 121 on a particular client device 106 and/or the management service 118 can generate a scenario message 139 at a time associated with the person waking up and distribute the scenario message 139 accordingly.

The scenario message 139 can be in XML format, JSON format, and/or any other type of format as can be appreciated. An example, scenario message 139 that can be broadcasted to the other devices 106 in the network 109 can be the following:

<?xml version="1.0"?>
<scenario>
<name>Start Meeting</name>
<closedgroup>conferenceRoomEinstein</closedgroup>
<starttime>now</starttime>
<parameter key="Content" value=https://youtube.com?v=xyz>
</scenario>

In this example, the scenario is identified as "Start Meeting", the device group is identified as devices 106 in "conferenceRoomEinstein", the scenario start time is "now", and the content to be played is identified by a uniform resource locator (URL).

When an agent application 124 on a client device 106 receives a scenario message 139, the agent application 124 can determine whether the client device 106 is an intended recipient of the broadcasted scenario message 139. For example, the broadcasted scenario message 139 can include a group name, group identifier, and/or other type of indicator that defines the devices 106 associated with the scenario message 139. The agent application 124 can use the indicator provided in the scenario message 139 to determine if the client device 106 is an intended recipient.

For example, if the scenario message 139 indicates that the group corresponds to client devices 106 located in a kitchen, the agent application 124 can compare the group identifier 136 of the client device 106 and/or device location of the client device 106 with the group indicator of the scenario message 139 to determine if the client device 106 is in the kitchen device group. In some implementations, the scenario message 139 does not indicate a device group, and the agent application 124 can determine if the client device 106 is an intended recipient based on whether a scenario profile 127 is stored in the client device 106 for the identified scenario. If the client device 106 is determined to be an intended recipient, the agent application 124 can access the scenario profile 127 for the identified scenario from the data store 133. The agent application 124 can then implement the tasks according to the scenario profile 127.

In some implementations, the agent application 124 can determine that a particular task cannot occur until completion of another task that is associated with another scenario. For example, assume a scenario is to "cook casserole" and one of the devices 106 associated with the scenario include a smart refrigerator. Further, assume that a task of the refrigerator is to determine a quantity of milk, and the refrigerator determines that there is no milk. The agent application 124 of the refrigerator can generate a scenario message 139 corresponding to an "out of milk" scenario and broadcast the message 139 to the other devices 106 in the network 109. Another client device 106 in the network 109 that can perform the task of ordering the milk can receive the scenario message 139 and perform the task accordingly. In this situation, the refrigerator is not required to know what other client device 106 in the network 109 performs the task. Rather, the refrigerator can broadcast the scenario message 139, allowing the devices 106 to work collaboratively to implement the tasks for a scenario without any type of device pairing or identification.

Turning now to FIG. 2, shown is example of a networked environment 200 including client devices 106a-f in a network 109 according to various embodiments. The client devices 106 in FIG. 2 are client devices 106 located in a location 202. Client device 106a includes a mobile device, client device 106b includes speakers, client device 106c includes a lighting system, client device 106d includes a thermostat, client device 106e includes a television, and client device 106f includes a blind system.

Each of the different client devices 106b-f have different capabilities and can be configured to perform different tasks for a given scenario. For example, tasks associated with a television 106e can include powering on, powering off, adjusting the volume, changing the channel, and/or other tasks. Similarly, tasks associated with a thermostat device 106d can include adjusting temperature, turning on/off a fan, turning on/off heat, turning on/off air-conditioning, and/or other tasks. Further, each client device 106b-f will have previously received a scenario profile 127 from the management service 118 of the management system 103 identifying the different tasks to perform for a given scenario.

Using the example of FIG. 2, a user can select the "Begin Meeting" component on a user interface rendered on client device 106a. Selection of this component can cause a client application 121 executed on client device 106a to generate a scenario message 139. The scenario message 139 can indicate that that the scenario is "Begin Meeting," the group is "Meeting Room A," and the time of the scenario is "now". The client application 121 can then cause the scenario message 139 to be broadcasted to all other devices 106 on the network 109. For example, the client application 121 can request the management service 118 to distribute the scenario message 139 to all devices 106 in the network 109.

When the scenario message 139 is broadcasted, the agent application 124 on each of the client devices 106 in the network 109 receives the scenario message 139. In the example of FIG. 2, client devices 106b-106f are all in the device group associated with Meeting Room A. As such, the agent applications 124 for each of the client devices 106b-106f will determine that they are each intended recipients of the scenario message 139. Each device 106 will then access the stored scenario profile 127 for the "Begin Meeting" scenario and implement the respective tasks defined in the scenario profile 127.

For example, client device 106b can power on; client device 106c can power on and adjust the brightness according to specific setting; client device 106d can be configured to adjust to a predefined temperature; client device 106e can power on, turn to a predefined channel, begin streaming video content, and set the volume at defined level; and client device 106f can close the blinds. Each client device 106 performs the tasks defined by the scenario profile 127 in response to receiving the broadcasted message 139. As such, there is no additional need for a controller device to pair with each device 106 and/or to instruct each device 106 individually to set the environment for a given scenario.

Figure 3:
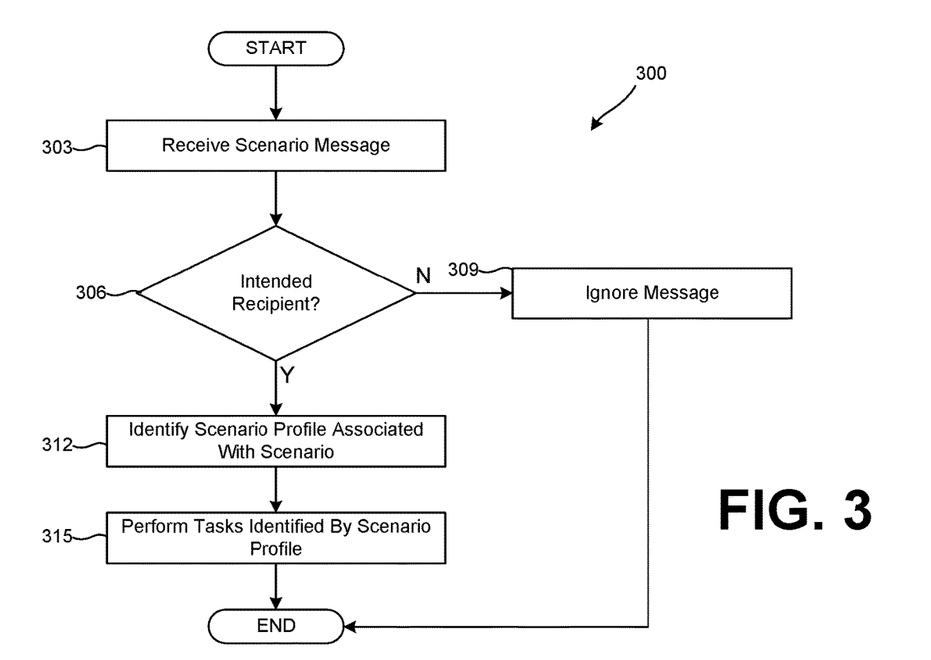
FIGS. 3-6 are example flowcharts illustrating functionality implemented by components of the networked environment.

Moving on to FIG. 3, shown is a flowchart that provides one example of the operation of a portion of the client device 106. The flowchart of FIG. 3 can be viewed as depicting an example of elements of a method implemented by the agent application 124, or other suitable software component according to one or more examples. The separation or segmentation of functionality as discussed herein is presented for illustrative purposes only.

In step 303, the agent application 124 receives a scenario message 139. According to various embodiments, the scenario message 139 is broadcasted from another device 106 and/or the management service 118 to all other devices connected to the network 109. The scenario message 139 can include an identification of a given scenario, a group of devices 106 associated with the given scenario, a time associated with the given scenario, and/or other information.

In step 306, the agent application 124 determines whether the client device 106 is an intended recipient. The scenario message 139 can identify a group of client devices 106 associated with the given scenario. For example, if the scenario corresponds to a meeting in Meeting Room A, the group of client devices 106 for the given scenario include all the devices 106 in Meeting Room A. In another example, if the scenario corresponds to a meal preparation, the group of client devices 106 for the given scenario can include all of the client devices 106 in the kitchen. In determining whether the client device 106 is an intended recipient, the agent application 124 can compare, for example, a group identifier 136 associated with the client device 106 to a group identifier included in the scenario message 139. If the group identifier 136 does not match, the agent application 124 proceeds to step 309 where the agent application 124 ignores the scenario message 139 and the process can proceed to completion. If the group identifier 136 matches the group identified in the scenario message 139, the agent application 124 can determine that the client device 106 is an intended recipient and proceed to step 312.

In step 312, the agent application 124 identifies a scenario profile 127 associated with the scenario identified in the scenario message 139. For example, if the scenario corresponds to a meeting, the agent application 124 can identify the scenario profile 127 related to a meeting scenario.

In step 315, the agent application 124 executes the tasks identified by the scenario profile. For example, if the client device 106 corresponds to a television, the agent application 124 can cause the television to turn on and set the volume to a defined volume level. Similarly, if the client device 106 corresponds to a smart blind system, the agent application 124 can cause the smart blind system to lower the blinds. Thereafter, the process can proceed to completion.

Figure 4:
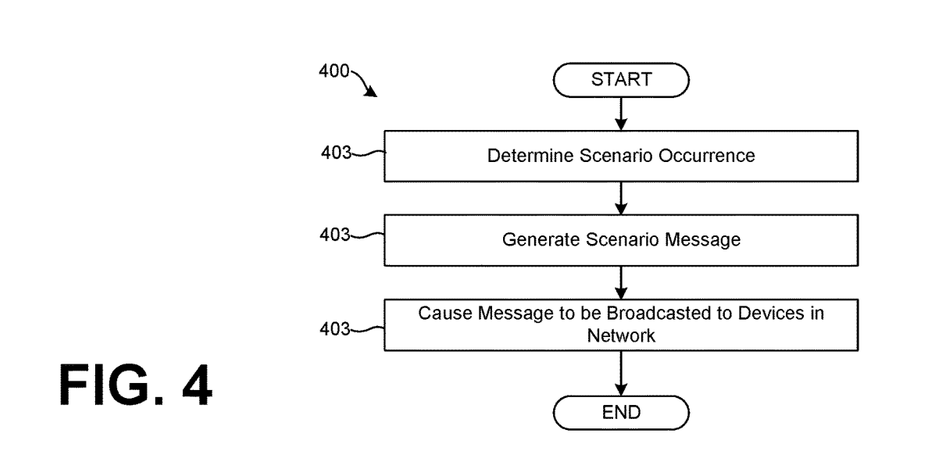

Moving on to FIG. 4, shown is a flowchart that provides one example of the operation of a portion of the client device 106. The flowchart of FIG. 4 can be viewed as depicting an example of elements of a method implemented by the agent application 124, client application 121 or other suitable software component according to one or more examples. The separation or segmentation of functionality as discussed herein is presented for illustrative purposes only.

In step 403, the client application 121 determines an occurrence of an event. For example, a user of a client device 106 can interact with a user interface and select a selectable component associated with a particular scenario. According to various implementations, the client application 121 can determine the occurrence of the scenario based on the user input. For example, assume that the scenario is a meeting; a user can select a component in a user interface to indicate the start of the meeting. In some implementations, a user can further define via user input additional parameters associated with the given scenario. For example, the user can define a start of the scenario, a location of the scenario, a device group associated with the scenario, and/or other information.

In step 406, the client application 121 generates the scenario message 139. The scenario message 139 can be generated to include a name of the scenario, a device group, a start time, and/or other information as can be appreciated. The name of the scenario can be used by other client devices 106 to identify the type of scenario. Similarly, the device group can be used by other client devices 106 to determine whether they are part of the group associated with the given scenario. As such, this indicator can be used by the client device 106 in determining whether they are an intended recipient. The time of the scenario can be used to indicate if the scenario is immediate or is to start a predetermined time. The scenario message 139 can be generated in Extensible Markup Language (XML) format, JavaScript Object Notation (JSON) format, and/or any other type of format as can be appreciated.

In step 403, the client application 121 causes the scenario message 139 to be broadcasted to the other devices 106 in the network 109. For example, without knowing and/or being paired to the other client devices 106 in the network 109, the client device 106 can cause the scenario message 139 to be transmitted to all of the other devices 106 in the network 109 by broadcasting the scenario message 139 to all devices 106 associated with the network 109. In other implementations, the scenario message 139 can request the management service 118 to broadcast the message 139 to the other devices. In other example, the client application 121. Thereafter, the process can proceed to completion.

Figure 5:
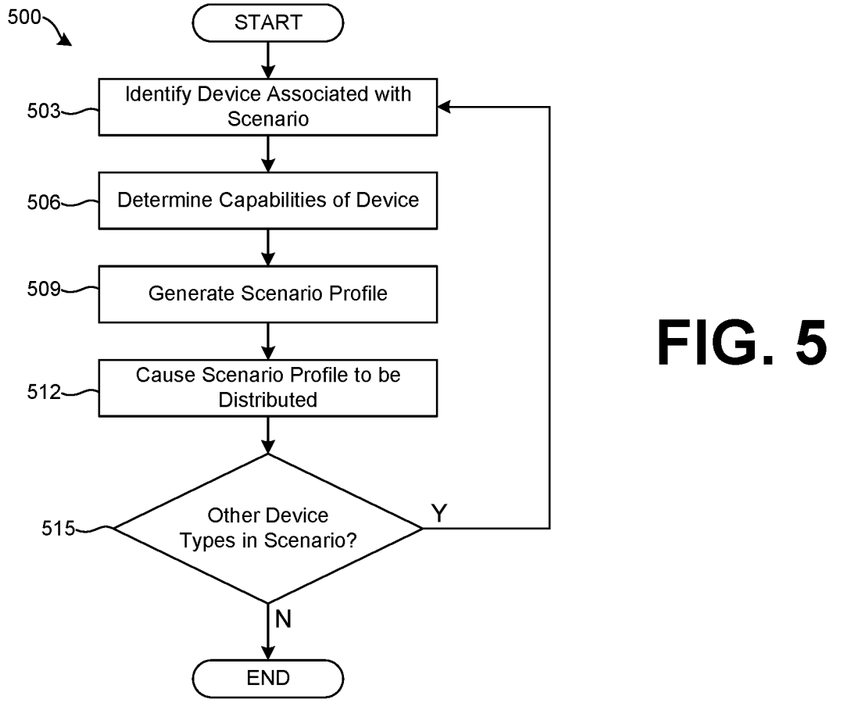

Moving on to FIG. 5, shown is a flowchart 500 that provides one example of the operation of a portion of the management system 103. The flowchart of FIG. 5 can be viewed as depicting an example of elements of a method implemented by the management service 118, or other suitable software component according to one or more examples. The separation or segmentation of functionality as discussed herein is presented for illustrative purposes only.

In step 503, the management service 118 identifies a client device 106 associated with a given scenario. For example, the management service 118 can determine the client devices 106 within a network that are managed by the management service 118. In some implementations, an administrator can define, via an administrator console, a type of scenario and the different client devices 106 that are associated with the given scenario. In some implementations, a scenario can be defined by an administrator and the management service 118 can identify a client device 106 according to a location of the client device 106 and a location associated with the given scenario. For example, if a scenario is associated with a meeting in Meeting Room A, the management service 118 can identify a client device 106 that is located in Meeting Room A according to device data 130 associated with the client device 106.

In step 506, the management service 118 can determine the capabilities of the client device 106. The capabilities of the client device 106 can include the different tasks that can be performed by the client device. For example, the capabilities can include tasks such as powering on, powering off, adjusting setting levels, and/or other capabilities associated with a given client device 106. The capabilities of the client device 106 can be determined according to the device data 130 associated with the device 106.

In step 509, the management service 118 generates the scenario profile 127 for the given client device 106. The scenario profile 127 identifies tasks to be performed with respect to the given scenario and the capabilities of the client device 106. The scenario profile 127 further defines settings associated with particular functions and/or features of the client device 106. In some implementations, the scenario profile 127 can be generated according to administrator inputs received via an administrator console. In other implementations, parameters of the scenario profile 127 can be generated according to learned data. For example, the management service 118 can received event data 141 associated with the client devices 106 that include timestamps and indications of events (e.g., powering on, adjusting channel, adjusting volume, etc.) associated with the devices 106. The management service 118 can correlate an event occurrence with a scenario occurrence based at least in part on the timestamp associated with the event data 141 from the managed devices 106. The management service 118 can define, adjust, and/or modify parameters in the scenario profile 127 based on the received data. The scenario profile 127 can be generated in Extensible Markup Language (XML) format, JavaScript Object Notation (JSON) format, and/or any other type of format as can be appreciated.

In step 512, the management service 118 can cause the scenario profile 127 to be distributed to the client device 106. In some implementations, the management service 118 can push the scenario profile 127 to the client device 106. In other implementations, the management service 118 can place the scenario profile 127 in a command queue associated with the client device and the client device 106 can obtain the scenario profile 127 from the command queue.

In step 515, the management service 118 determines if there are other types of client devices 106 associated with the given scenario. If there are other types of client devices 106, the management service 118 returns to step 503. If there are no other client devices 106, the process can proceed to completion.

Figure 6:
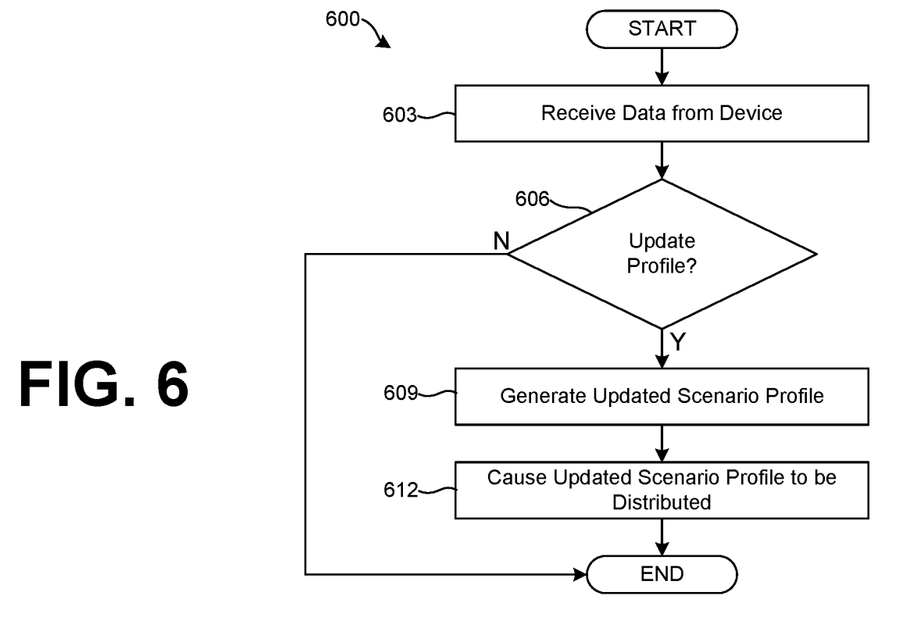

Moving on to FIG. 6, shown is a flowchart that provides one example of the operation of a portion of the management system 103. The flowchart of FIG. 6 can be viewed as depicting an example of elements of a method implemented by the management service 118, or other suitable software component according to one or more examples. The separation or segmentation of functionality as discussed herein is presented for illustrative purposes only.

In step 603, the management service 118 receives data from a client device 106. The data received from the client device 106 can include data associated with the operation and functionality of the client device 106. For example, the data can include information related to the state of the client device 106 at a given time, event data 141 related to an adjustment and/or trigger associated with a capability of the client device 106 (e.g., turning the device on, adjusting a setting, etc.), and/or any other data associated with the managed client device 106.

In step 606, the management service 118 determines whether an updated scenario profile 127 should be generated. For example, the data received from the client device 106 can indicate that a particular setting to a function and/or feature of the client device 106 was changed by a user input (e.g., power on, power off, adjust volume, adjust temperature, etc.). The management service 118 can determine that the particular setting occurred during an occurrence of a particular scenario (e.g., meeting, cooking meal, etc.). The management service 118 can further determine, using historical data (e.g., event data 141) collected from the client device 106 over a period of time, that the particular setting is inputted consistently each time the scenario occurs.

Assuming the particular setting is not part of the current scenario profile 127, the management service 118 can determine whether the current scenario profile 127 should be updated to include the setting. For example, if a number of times the setting has been changed during a scenario occurrence meets or exceeds a predefined threshold, the management service 118 can determine to update the particular scenario profile 127. Likewise, if a number of times the setting has been changed is below the predefined threshold, the management service 118 can determine that the scenario profile 127 does not need to be updated. If an update to the scenario profile 127 is not to occur, the process can proceed to completion. Otherwise, the process proceeds to step 609.

In step 609, the management service 118 generates an updated scenario profile 127. In some implementations, the management service generates a complete scenario profile 127 to reflect the determined update. In other implementations, the management service 118 generates an updated scenario profile 127 that includes only the parameters affected by the update. For example, if only the volume of a television is to be adjusted, the updated scenario profile 127 can only include the parameter associated with the television volume.

In step 612, management service 118 can cause the updated scenario profile 127 to be distributed to the client device 106. In some implementations, the management service 118 can push the updated scenario profile 127 to the client device 106. In other implementations, the management service 118 can place the updated scenario profile 127 in a command queue associated with the client device 106, and the client device 106 can obtain the scenario profile 127 from the command queue. Thereafter, the process can proceed to completion.

A number of software components are stored in the memory and executable by a processor. In this respect, the term "executable" means a program file that is in a form that can ultimately be run by the processor. Examples of executable programs can be, for example, a compiled program that can be translated into machine code in a format that can be loaded into a random access portion of one or more of the memory devices and run by the processor, code that can be expressed in a format such as object code that is capable of being loaded into a random access portion of the one or more memory devices and executed by the processor, or code that can be interpreted by another executable program to generate instructions in a random access portion of the memory devices to be executed by the processor. An executable program can be stored in any portion or component of the memory devices including, for example, random access memory (RAM), read-only memory (ROM), hard drive, solid-state drive, USB flash drive, memory card, optical disc such as compact disc (CD) or digital versatile disc (DVD), floppy disk, magnetic tape or other memory components.

Memory can include both volatile and nonvolatile memory and data storage components. Also, a processor can represent multiple processors or multiple processor cores, and the one or more memory devices can represent multiple memories that operate in parallel processing circuits, respectively. Memory devices can also represent a combination of various types of storage devices, such as RAM, mass storage devices, flash memory, or hard disk storage. In such a case, a local interface can be an appropriate network that facilitates communication between any two of the multiple processors or between any processor and any of the memory devices. The local interface can include additional systems designed to coordinate this communication, including, for example, performing load balancing. The processor can be of electrical or of some other available construction.

Although the management service 118, client applications 121, agent applications 124, and other various services and functions described can be embodied in software or code executed by general purpose hardware as discussed above, as an alternative, the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include discrete logic circuits having logic gates for implementing various logic functions upon an application of one or more data signals, application specific integrated circuits (ASICs) having appropriate logic gates, field-programmable gate arrays (FPGAs), or other components.

The flowcharts show an example of the functionality and operation of an implementation of portions of components described. If embodied in software, each block can represent a module, segment, or portion of code that can include program instructions to implement the specified logical function(s). The program instructions can be embodied in the form of source code that can include human-readable statements written in a programming language or machine code that can include numerical instructions recognizable by a suitable execution system such as a processor in a computer system or other system. The machine code can be converted from the source code. If embodied in hardware, each block can represent a circuit or a number of interconnected circuits to implement the specified logical function(s).

Although the flowcharts show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, one or more of the blocks shown in the drawings can be skipped or omitted.

Also, any logic or application described that includes software or code can be embodied in any non-transitory computer-readable medium for use by or in connection with an instruction execution system such as a processor in a computer system or other system. In this sense, the logic can include, for example, statements including instructions and declarations that can be fetched from the computer-readable medium and executed by the instruction execution system. In the context of the present disclosure, a "computer-readable medium" can be any medium that can contain, store, or maintain the logic or application described for use by or in connection with the instruction execution system.

The computer-readable medium can include any one of many physical media, such as magnetic, optical, or semiconductor media. More specific examples of a suitable computer-readable medium include solid-state drives or flash memory. Further, any logic or application described can be implemented and structured in a variety of ways. For example, one or more applications can be implemented as modules or components of a single application. Further, one or more applications described can be executed in shared or separate computing devices or a combination thereof. For example, a plurality of the applications described can execute in the same computing device, or in multiple computing devices.

It is emphasized that the above-described embodiments of the present disclosure are merely possible examples of implementations described for a clear understanding of the principles of the disclosure. Many variations and modifications can be made to the above-described embodiments without departing substantially from the spirit and principles of the disclosure. All such modifications and variations are intended to be included within the scope of this disclosure.

Therefore, the following is claimed:

1. A system for implementing scenario profiles, the system comprising:
   a computing device; and
   at least one application executable in the computing device, wherein the at least one application, when executed, causes the computing device to:
      receive a message identifying a scenario associated with a performance of a plurality of different tasks performed by a plurality of computing devices having different capabilities, the message being broadcasted over a network including the plurality of computing devices, and the message comprising at least one of a scenario name, a scenario start time, or a link for accessing content associated with the scenario;
      determine that the computing device is an intended recipient of the message;
      access a scenario profile associated with the scenario, the scenario profile indicating at least one task of the plurality of different tasks to be performed by the computing device; and
      execute the task.

2. The system of claim 1, wherein when executed, the at least one application further causes the computing device to at least receive the scenario profile from a management server device.

3. The system of claim 1, wherein:
   the message further includes a scenario group identifier for a group of computing devices in a scenario group associated with the scenario, and
   determining that the computing device is the intended recipient of the message further comprises determining that the computing device is included in the scenario group based on the scenario group identifier.

4. The system of claim 1, wherein:
   the computing device is a first computing device of the plurality of computing devices in the network; and
   individual computing devices of the plurality of computing devices have different scenario profiles from one another for the scenario according to respective capabilities of the individual computing devices.

5. The system of claim 1, wherein when executed, the at least one application further causes the computing device to at least:
   determine that the task requires completion of another task by another computing device;
   generate another message identifying another scenario associated with the other task; and
   cause the other message to be broadcasted to a plurality of other computing devices in the network.

6. The system of claim 1, wherein when executed, the at least one application further causes the computing device to at least:
   identify an event associated with a capability of the computing device; and
   send a notification of the event to a management server device, the notification including event data identifying the event.

7. The system of claim 6, wherein when executed, the at least one application further causes the computing device to at least receive an updated scenario profile, the updated scenario profile being dynamically generated by the management server device based at least in part on the event data.

8. A computer-implemented method for implementing scenario profiles, the method comprising:
   receiving, by a computing device, a message identifying a scenario associated with a performance of a plurality of different tasks performed by a plurality of computing devices having different capabilities, the message being broadcasted over a network including the plurality of computing devices, and the message comprising at least one of a scenario name, a scenario start time, or a link for accessing content associated with the scenario;
   determining that the computing device is an intended recipient of the message;
   accessing, on the computing device, a scenario profile associated with the scenario, the scenario profile indicating at least one task of the plurality of different tasks to be performed by the computing device; and
   executing the task.

9. The computer-implemented method of claim 8, further comprising receiving the scenario profile from a management server device.

10. The computer-implemented method of claim 8, wherein:
    the message further includes a scenario group identifier for a group of computing devices in a scenario group associated with the scenario, and
    determining that the computing device is the intended recipient of the message further comprises determining that the computing device is included in the scenario group based on the scenario group identifier.

11. The computer-implemented method of claim 8, wherein:
    the computing device is a first computing device of the plurality of computing devices in the network; and
    individual computing devices of the plurality of computing devices have different scenario profiles from one another for the scenario according to respective capabilities of the individual computing devices.

12. The computer-implemented method of claim 8, further comprising:
    determining that the task requires completion of another task by another computing device;

generating another message identifying another scenario associated with the other task; and causing the other message to be broadcasted to a plurality of other computing devices in the network.

13. The computer-implemented method of claim 8, further comprising:

identifying an event associated with a capability of the computing device; and sending a notification of the event to a management server device, the notification including event data identifying the event.

14. The computer-implemented method of claim 13, further comprising receiving an updated scenario profile, the updated scenario profile being dynamically generated by the management server device based at least in part on the event data.

15. A non-transitory computer-readable medium embodying a program executable in a computing device, wherein when executed, the program causes the computing device to at least:

receive a message identifying a scenario associated with a performance of a plurality of different tasks performed by a plurality of computing devices having different capabilities, the message being broadcasted over a network including the plurality of computing devices, and the message comprising at least one of a scenario name, a scenario start time, or a link for accessing content associated with the scenario;

determine that the computing device is an intended recipient of the message;

access a scenario profile associated with the scenario, the scenario profile indicating at least one task of the plurality of different tasks to be performed by the computing device; and execute the task.

16. The non-transitory computer-readable medium of claim 15, wherein when executed, the program further causes the computing device to at least receive the scenario profile from a management server device.

17. The non-transitory computer-readable medium of claim 15, wherein:

the message further includes a scenario group identifier for a group of computing devices in a scenario group associated with the scenario, and determining that the computing device is the intended recipient of the message further comprises determining that the computing device is included in the scenario group based on the scenario group identifier.

18. The non-transitory computer-readable medium of claim 15, wherein:

the computing device is a first computing device of the plurality of computing devices in the network; and individual computing devices of the plurality of computing devices have different scenario profiles from one another for the scenario according to respective capabilities of the individual computing devices.

19. The non-transitory computer-readable medium of claim 15, wherein, when executed, the program further causes the computing device to at least:

determine that the task requires completion of another task by another computing device;

generate another message identifying another scenario associated with the other task; and cause the other message to be broadcasted to a plurality of other computing devices in the network.

20. The non-transitory computer-readable medium of claim 15, wherein, when executed the program further causes the computing device to at least:

identify an event associated with a capability of the computing device; and send a notification of the event to a management server device, the notification including event data identifying the event.

* * * * *